United States Patent
Kim (12)

(10) Patent No.: US 6,196,590 B1
(45) Date of Patent: Mar. 6, 2001

(54) SLIDE HATCH FOR BULK CARRIER

(76) Inventor: Sun Y. Kim, 2384 Lancaster Ct., Hayward, CA (US) 94542

( * ) Notice: Subject to any disclaimer, the term of this patent is extended or adjusted under 35 U.S.C. 154(b) by 0 days.

(21) Appl. No.: 09/350,947

(22) Filed: Jul. 9, 1999

(51) Int. Cl.[7] .............................. B65D 43/26; B60P 3/22
(52) U.S. Cl. ..................... 280/830; 220/262; 220/345.2; 49/360
(58) Field of Search ............... 220/345.1, 345.2, 220/348, 349, 345.4, 345.6, 562, DIG. 4, 262; 280/830, 838, 839; 410/68; 49/360

(56) References Cited

U.S. PATENT DOCUMENTS

| 3,131,925 | * | 5/1964 | Coats | 220/262 |
|---|---|---|---|---|
| 3,142,410 | * | 7/1964 | Arnold | 220/262 |
| 3,339,785 | * | 9/1967 | Nugent | 220/345.6 |
| 3,386,206 | * | 6/1968 | Loveless | 49/360 |
| 4,653,662 | * | 3/1987 | Wise et al. | 220/262 |
| 5,190,182 | * | 3/1993 | Copas et al. | 220/262 |
| 6,105,805 | * | 8/2000 | Labelle et al. | 220/262 |

* cited by examiner

Primary Examiner—Lanna Mai
Assistant Examiner—Ruth Ilan
(74) Attorney, Agent, or Firm—Richard Esty Peterson Patent Attorney

(57) ABSTRACT

A slide hatch for a bulk carrier vehicle for removing a hatch cover from an access port on the top of a carrier tank on the vehicle, the slide hatch including a slide carriage connected to the hatch cover and to an actuator which displaces the slide carriage and back cover with the slide carriage mounted on a track and connected to a cam mechanism for forcing the cover against the access port when the cover is displaced over the port for sealing the tank.

12 Claims, 4 Drawing Sheets

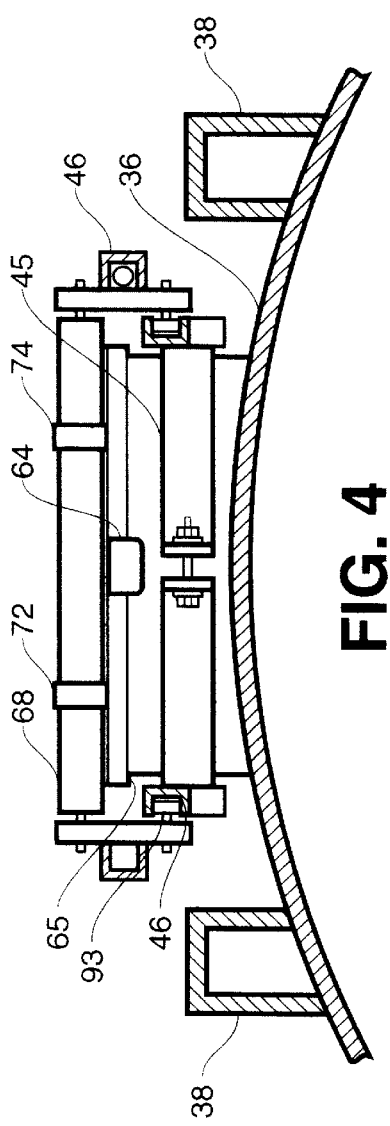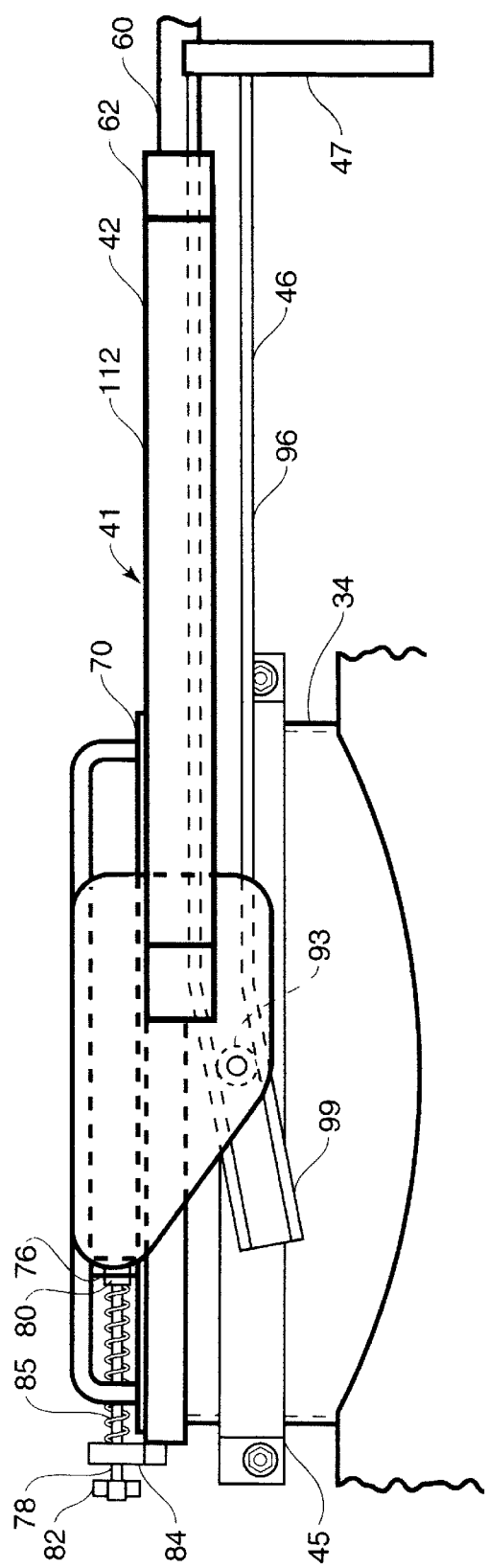

SLIDE HATCH FOR BULK CARRIER

BACKGROUND OF THE INVENTION

This invention relates to a slide hatch for a bulk carrier, in particular for a vehicle carrier for dry cement. The slide hatch can be used on any bulk carrier vehicle of the type used for transport of dry powdered or granular material that is free flowing in a hopper style container. This description utilizes a cement carrier as a preferred example of the transport carrier contemplated. Bulk transport of dry cement is accomplished utilizing a gondola-style trailer that is loaded with cement from a top port by means of a hose or chute. Typically, the gondola has a tank with sloping sides that converge to a bottom discharge for gravity feed of the cement to a discharge hose that is used to pneumatically deliver the bulk cement to a destination for storage or mixing. To assist in the discharge of the fine powder cement, the gondola tank is pressurized to both compensate for volumetric displacement by the discharging cement and to assist in moving the cement to the discharge pump.

To maintain a pressure within the gondola tank, the hatch cover must have a sealed engagement with the hatch port at the top of the tank. Typically, the hatch cover is connected to the tank with a hinge and a series of threaded dogs mounted around the hatch cover. When the tank is refilled, the hatch cover must be opened which has customarily required that the driver or assistant climb to the top of the trailer and manually disengage the tie-down dogs to open the hatch. Not only is this task time consuming, but because of the configuration of the tank and carrier trailer the task is dangerous as well.

The slide hatch for bulk carriers of this invention is designed to enable removal of a hatch cover by an automatic or manual actuator. The system for displacing the hatch cover is designed to not only position the hatch cover over the access port but to forcibly seat the hatch cover on the port rim to create a hermetic seal for allowing internal pressurization of the gondola tank. In this manner removal and replacement of the hatch cover can be accomplished automatically with a piston type actuator operated from inside the vehicle cab, or manually from the end of the trailer without having to climb on top of the tank.

SUMMARY OF THE INVENTION

The slide hatch for bulk carriers of this invention comprises a manually or automatically operated hatch cover for the access port of a vehicle bulk carrier. In particular, the slide hatch is designed for a bulk dry powder material carrier that is customarily pressurized to assist in pneumatically discharging the transported material to a storage or mixing facility. The typical vehicle carrier for dry material includes a gondola tank having a top hatch that covers an access port for filling the gondola tank with a bulk material such as dry cement. The access port also function as a manhole for entry into the tank for clean-out or repair. Because the hatch is pressurized during discharge of the transported material, the hatch must be secured with sufficient force to withstand the internal pressurization.

The slide hatch of this invention permits removal and replacement of the hatch to be accomplished without having to climb onto the top of the gondola tank and manually remove a series of tie-down dogs. This task must be performed before the vehicle is moved into position for loading of the carrier with the bulk material. Not only is this task time consuming, it is dangerous and can result in injury. Customarily, a ladder on the carrier is provided to ascend to the top of the tank which may be contoured with a narrow access between longitudinal reinforcement members for the tank. After the carrier tank has been filled with material, the cover must be replaced and secured. The slide hatch of this invention includes a hatch mechanism for manually or automatically removing and replacing the hatch cover over an access port utilizing a displacement mechanism that securely seats the hatch cover on the access port. These and other features will become apparent upon a detailed consideration of the preferred embodiments.

BRIEF DESCRIPTION OF THE DRAWINGS

FIG. 4 is a cross sectional view of the slide hatch taken on the lines 4—4 in FIG. 2.

FIG. 5 is a partial side elevational view of the slide hatch of FIG. 2.

DETAILED DESCRIPTION OF THE PREFERRED EMBODIMENTS

Figure 1:
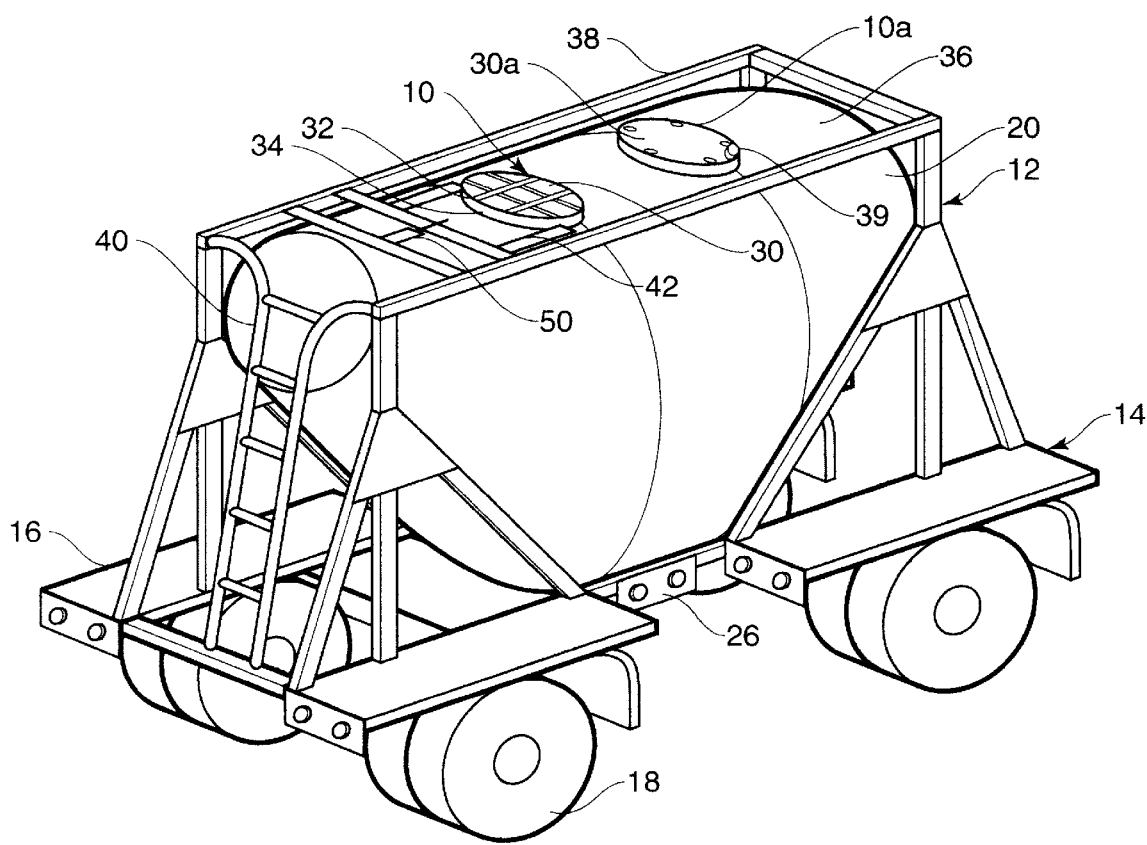
FIG. 1 is a perspective view of a bulk material carrier of the general type in which the invented slide hatch is installed.

Referring to FIG. 1, the slide hatch, designated generally by the reference numeral 10 is shown as an assembly at the top of a bulk carrier 12. The bulk carrier 12 is typical of the type of transport carrier used for dry bulk material such as cement, flour, grain and other granular or powdered materials. In the embodiment of FIG. 1, the bulk carrier 12 comprises a trailer 14 with a carriage 16 having transport wheels 18 for transporting a carrier tank 20 mounted in a frame 25 on the carriage 16. The carrier tank 20 customarily has sloping end walls 22 that converge to a discharge (not visible) where the transported material is removed by a pump apparatus 26. To assist in the removal of the transported material, the carrier tank 20 is maintained under pressure during discharge through a pneumatic piping system (not shown).

The slide hatch 10 at the top of the carrier tank 20 includes a hatch cover 30 that caps an access port 32 having a rim 34 that is raised from the curved top surface 36 of the carrier tank 20. Along side the raised rim 34 are two reinforcing beams 38 that act as stiffeners for the tank top 36. An access ladder 40 that provides access to the tank top 36 is used for maintenance and clean-out of the tank through the access port 32. The access port 32 functions both as a manhole and a filler port for filling the carrier tank with dry material using a chute or filler hose.

Prior to the installation of the slide hatch 10, the access hatch 10a had a hatch cover 30a that was typically secured by a series of tie-down dogs 39, as shown for the hatch 10a without the slide assembly in FIG. 1 which had to be removed for raising the cover on a hinge. Access to the cover for this task was provided by the ladder 40. With the installation of the slide hatch 10, the hatch cover 30 can be removed and replaced using an activation switch within the truck cab, or manually using the access ladder 40 and a worm screw without having to climb to the tank top 36.

Referring now to FIGS. 2 to 5, the hatch cover 30 is connected to a displacement mechanism 41 having a slide carriage 42 that is displaceable on a slide track 44 which is mounted on each side of the raised rim 34 of the access port 32. The slide track 44 is secured to the rim 34 using a circular clamp 45, to which track rails 46 are welded. The track 44 also includes supports 47 and a cross member 48 that are braced between the beams 38. The slide carriage 42 is displaced by an actuator assembly 50 that preferably includes both a pneumatic piston 52 and a manual screw mechanism 54 having an elongated worm screw 56 for emergency use. The pneumatic piston 52 includes a cylinder 58 and a piston rod 60 that extends from the cylinder 58 and is connected to the cross brace 62 of the slide carriage 42. Upon extension of the piston 60, the slide carriage 42 is extended to the position shown in FIG. 2 with the hatch cover 30 positioned in a covering position on the access port 32. To insure that the hatch cover 30 is appropriately positioned, a stop 64 on the hatch cover engages the edge of the access port rim 34. In this manner the perimeter seat 65 on the underside of the cover, which may be a deformable seal, properly seats on the rim 34. The slide carriage 42 includes two cross rollers 66 and 68 which are seated on the flat top surface 70 of the hatch cover 30 and retained by elongated brackets 72 and 74. Parallel with the cross roller 66 is a cross mount 76 which supports a rod 78 having threaded ends with a pair of lock nuts 80 (one shown in FIG. 5) on each side of the cross mount 76 at one end and a stop nut 82 at the opposite end. This arrangement allows the rod to slidably project through a hole in an end bracket 84 to compress a spring 85 and bias the carriage 42 relative to the hatch cover 30 during engagement of the hatch cover 30 with the rim 34.

Since the hatch cover is displaceable relative to the slide carriage 42 the hatch cover can be forcibly secured to the raised rim by action of a cam mechanism 90. The cam mechanism 90 includes two vertically oriented end plates 92 that support and position the cross mount and the two cross rollers 66 and 68, which provide a connection device for interconnecting the cover 30 to the slide carriage 42. The end plates 92 interconnect the cross rollers 66 and 68 with a cam roller 93 on each side of the carriage 42. The cam rollers 93 on each side of the hatch rim 34 are located in the slide rails 46 of the slide and act as a rail follower. As shown in FIG. 5, the slide rails 46 have a horizontal portion 96 and an incline portion 99 at the side of the rim 34 that dips to cause the cross rollers 66 and 68 to forcibly contact the top surface 70 of the hatch cover 30 and force the hatch cover down against the raised rim 34. Since the hatch cover 30 has been positioned by the stop 64 the force of engagement is developed by further displacement of the actuator 50. The force of displacement of the slide carriage 42 transmits a vertical force vector against the cover by action of the cam rollers 93 in the inclined portion 99 of the rails 46. The incline portion 99 can be formed by an angled segment as shown, or a curved segment and is configured as necessary to adapt to the particular bulk carrier that is modified.

Figure 2:
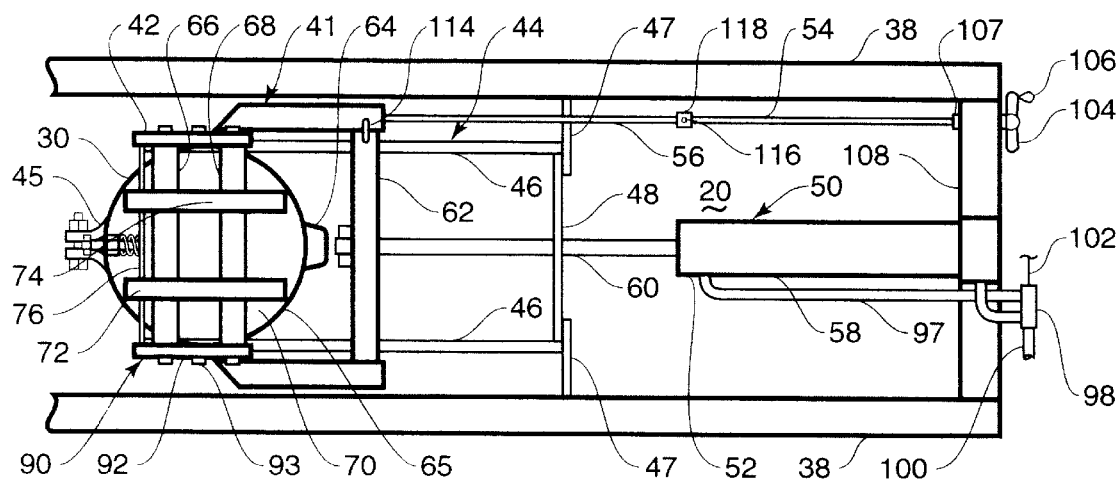
FIG. 2 is a top partial view of the slide hatch of FIG. 1 with the hatch cover in the closed position.
Figure 3:
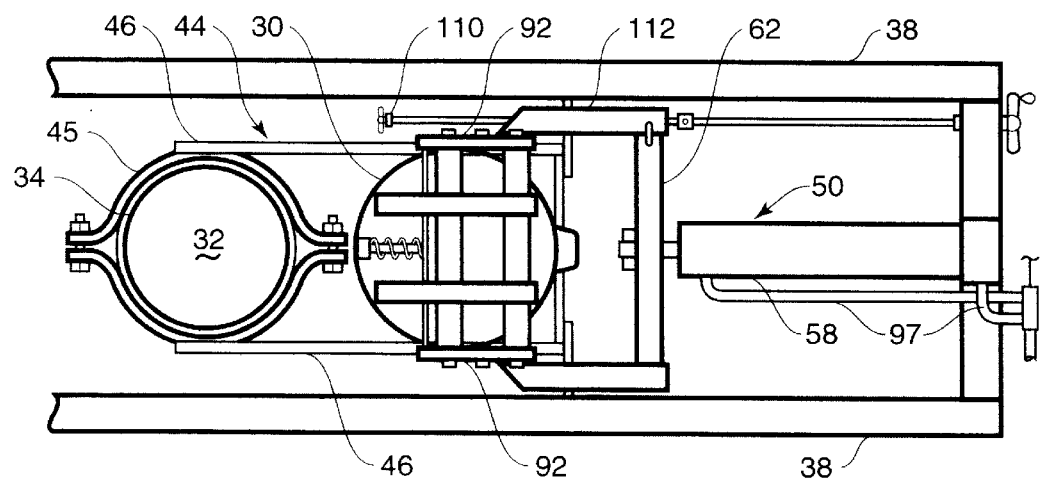
FIG. 3 is a top partial view of the slide hatch of FIG. 1 with the cover in the retracted position.

When it is desired that the hatch cover 30 be removed, the actuator assembly 50 retracts the slide carriage 42 and with the aid of the compressed spring 85 shifts the hatch cover 30 relative to the slide carriage 42, unseating the hatch cover from the raised rim 34 and allowing the hatch cover 30 to be displaced with the slide carriage 42 to a position that fully exposes the access port 32 as shown in FIG. 3. As shown in FIGS. 2 and 3, the cylinder 58 of the pneumatic actuator device 50 is connected by hoses 97 which connect to a control box 98 that is supplied by pressurized air from a conduit 100 that connects to a conventional air pump on the vehicle used to pressurize the tank. The control box 98 is electrically actuated by a circuit line 102 to a switch (not shown) that is located within the vehicle cab.

In operation, the vehicle driver approaches the location of loading, actuates the actuator 50 by means of the switch to retract the cover from its position on the raised rim. Subsequent to loading the switch is again activated returning the cover to the closed position and sealing the access port. With the access port sealed, the cross rollers 66 and 68 and the cam rollers 93 act as a hold down for the hatch cover allowing pressurization of the tank during discharge.

In order to provide for situations where the pneumatic piston actuator is inoperative, for example, when the air pressure pump is located on a disconnected trailer cab and not on the trailer, the manual screw mechanism 54 can be engaged. The screw mechanism 54 has an end wheel 104 with a crank 106 for turning the screw 56 in a journal 107 in cross brace 108. A hex nut 110 proximate the end stop seats in a tapered socket (not shown) in one of the side arms 112 of the slide carriage 42 when the slide carriage 42 is in the extended covering position shown in FIG. 2.

With the pneumatic hoses open 102, the carriage 42 and cover 30 can be retracted using the screw mechanism 54 by turning the crank 106. To replace the cover, a U-shaped latch 114 can be raised, pivoted and dropped into recess 116 in a nut 118 to connect the nut 118 to the carriage 42. On counter-rotation of the screw the nut tracts on the screw 54 forcing the carriage and cover to the returned covering position.

It is to be understood that the described mechanical system is normally not engaged, and is an auxiliary system. A mechanical actuator replacing the pneumatic system would be center mounted and continuously engaged.

Additionally it is to be understood that a slide hatch system can be installed on multiple hatches either with a single actuator with tandem mounted slide carriages, or separate modules for each hatch.

Figure 6:
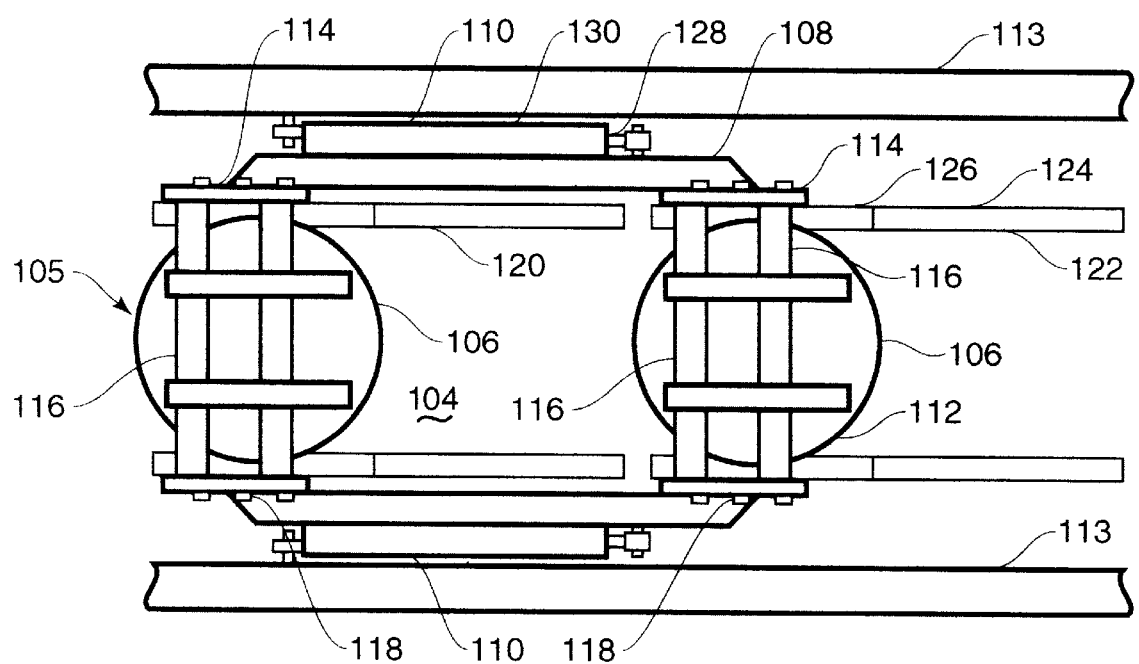
FIG. 6 is a schematic view of an alternate arrangement of the invented slide hatch.

Referring to FIG. 6, an alternate of arrangement the invented slide hatch 105 is schematically illustrated. A bulk carrier tank 104, has two hatch covers 106 that are interconnected and tandem operated by a carriage 108. The carriage 108 is actuated by a pair of pneumatic pistons 110 positioned on each side of the hatch covers 106 substantially between the access ports 112 (shown covered in FIG. 6). The pistons are connected at one end to the reinforcing beams 113 of the tank 104 and at the opposite end to the carriage 108. The use of two pistons and the positioning proximate the side of an access port also provides a convenient arrangement for a single slide hatch where insufficient room at the ends of the carrier tank is available for mounting the actuator.

In the arrangement of FIG. 6, the carriage 108 interconnecting the two hatch covers 106 has two sets of end plates 114 interconnecting two cross rollers 116 for each cover with cam rollers 118 (partially visible). A pair of separate tracks 120 and 122 each have a horizontal portion 124 and an incline portion 126 to urge the cross rollers 116 against the covers 106 when in the closed position as shown in FIG. 6. Displacement of the piston rods 128 from the cylinders 130, will displace the carriage 108 and the covers 106 to an open position, similar to the cover 30 of FIG. 3. The slide hatch 105 is in other respects similar to that of FIG. 1 and may either be welded to the carrier tank or mechanically mounted, for example with a clamping system as shown in FIGS. 2–5.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A slide hatch for a bulk carrier vehicle having a tank with a tank top with at least one access port with a rim raised from the tank top, the slide hatch comprising:
   a) a hatch cover having a top and an underside with a perimeter seat engageable with the rim of the access port when the cover is seated on the access port;
   b) a hatch cover slide apparatus mountable on the tank having:
      1) a displacement mechanism including:
         i) a slide track;
         ii) a slide carriage slidably engaged with the slide track and displaceable thereon; and
         iii) an actuator connected to the slide carriage; and,
      2) a cam mechanism interconnecting the hatch cover with the displacement mechanism, wherein the cam mechanism includes a cam mechanism bracket on the hatch cover and a coupling device engaging the cover and the cam mechanism bracket, the coupling device being connected to the displacement mechanism, wherein the actuator of the displacement mechanism displaces the slide carriage and hatch cover between a first position over the access port and a second position displaced from the access port, and wherein the cam mechanism seats the hatch cover on the access port when the hatch cover is positioned over the access port.

2. The slide hatch of claim 1 wherein the slide track includes at least one slide rail and the cam mechanism includes a rail follower connected to the slide carriage that tracks along the rail when the slide carriage is displaced, wherein the slide rail has an inclination that lowers the hatch cover onto the access port when the slide carriage is displaced toward the access port.

3. The slide hatch of claim 2 wherein the slide track includes first and second parallel slide rails mountable on each side of the access port.

4. The slide hatch of claim 2 wherein the rail follower comprises a cam roller.

5. The slide hatch of claim 1 wherein the bracket of the cam mechanism includes two elongated bracket members on the top of the hatch cover, and wherein the coupling device includes two elongated rollers transversely arranged under the bracket members against the top of the cover, the rollers having opposed ends, and wherein the carriage has a frame with spaced end plates, wherein the ends of the rollers are rotatably retained by the spaced end plates.

6. The slide hatch of claim 5 wherein the slide track includes a pair of slide rails and the cam mechanism includes a rail follower connected to each end plate of the carriage frame, each rail follower engaging a slide rail, wherein the slide rails have an inclination that lowers the hatch cover onto the access port when the slide carriage is displaced toward the access port.

7. The slide hatch of claim 6 wherein the actuator comprises a pneumatic piston and cylinder unit.

8. The slide hatch of claim 6 wherein the actuator comprises a worm screw unit.

9. The slide hatch of claim 6 wherein the end plates include a cross bar parallel to the elongated rollers and the hatch cover has a bracket, the hatch cover slide apparatus having a compression spring mounted between the hatch cover bracket and the cross bar.

10. The slide hatch of claim 6 wherein the hatch cover includes a stop that contacts the rim of the access port when the cover is positioned over the access port.

11. The slide hatch of claim 6 wherein the hatch cover slide apparatus includes a clamp mountable around the rim of the access port wherein the displacement mechanism is connected to the clamp.

12. In a bulk carrier vehicle having a carrier tank with at least one top access hatch with an access port and a hatch cover, a hatch cover slide apparatus comprising:
   a) a slide track having means for mounting the slide track on the carrier tank proximate the access port;
   b) a slide carriage having a track follower engaging the slide track wherein the slide carriage is slidable on the slide track;
   c) connecting means for connecting the hatch cover to the slide carriage;
   d) actuator means for displacing the slide carriage on the slide track wherein the slide track has a horizontal portion and an incline portion that vertically displaces the hatch cover relative to the access port, and,
   e) positioning means for positioning the hatch cover over the access port when the hatch cover is vertically displaced relative to the access port.

* * * * *